US008195754B2

(12) United States Patent
Beverly, IV

(10) Patent No.: US 8,195,754 B2
(45) Date of Patent: Jun. 5, 2012

(54) UNSOLICITED MESSAGE COMMUNICATION CHARACTERISTICS

(75) Inventor: Robert E. Beverly, IV, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 210 days.

(21) Appl. No.: 12/371,119

(22) Filed: Feb. 13, 2009

(65) Prior Publication Data

US 2010/0211640 A1    Aug. 19, 2010

(51) Int. Cl.
 *G06F 15/16* (2006.01)
(52) U.S. Cl. ........................... 709/206; 709/227
(58) Field of Classification Search .................. 709/206, 709/224, 230
 See application file for complete search history.

(56) References Cited

U.S. PATENT DOCUMENTS

| 2004/0267893 | A1* | 12/2004 | Lin | 709/207 |
| 2009/0044013 | A1* | 2/2009 | Zhu et al. | 713/170 |
| 2009/0172171 | A1* | 7/2009 | Amir | 709/227 |
| 2010/0145900 | A1* | 6/2010 | Zheng et al. | 706/52 |

OTHER PUBLICATIONS

Li et al., "Resisting Spam Delivery by TCP Damping", First Conf. on Email and Anti-Spam, Jul. 2004, p. 1-8.*
Beverly et al., "Exploiting Transport-Level Characteristics of Spam" Feb. 2008, CSAIL, p. 1-14.*
Coskun, V.; Cayirci, E.; Levi, A.; Sancak, S.; , "Quarantine region scheme to mitigate spam attacks in wireless-sensor networks," Mobile Computing, IEEE Transactions on , vol. 5, No. 8, pp. 1074-1086, Aug. 2006.*
Muhammad N. Marsono; M. Watheq El-Kharashi; Fayez Gebali; Sudhakar Ganti; , "Distributed Layer-3 E-Mail Classification for Spam Control," Electrical and Computer Engineering, 2006. CCECE '06. Canadian Conference on , vol., No., pp. 742-745, May 2006.*
Beverly et al.,"Exploiting Transport-Level Characteristics of Spam", Aug. 2008, Proceedings of the Fifth Conference on Email and Anti-Spam (CEAS 2008), Mountain View, CA, Aug. 2008, pp. 1-8.*
Clayton, Richard, "Using Early Results from the 'spamHINTS' Project to Estimate an ISP Abuse Team's Task," Third Conference on Email and Anti-Spam (CEAS 2006), Mountain View CA, USA, Jul. 28-29, 2006 (5 pages).
Brodsky, Alec and Dmitry Brodsly, "A Distributed Content Independent Method for Spam Detection," Proceedings of the first conference on First Workshop on Hot Topics in Understanding Botnets Cambridge, Massachusetts, USA 2007 (pp. 1-10).
Marsono et al., "Distributed Layer-3 E-Mail Classification for Spam Control," Canadian Conference on Electrical and Computer Engineering (CCECE) 2006 , May 2006(pp. 742-745).
Li, Kang and Calton Pu, "Resisting Spam Delivery by TCP Damping," First Conference on Email and Anti-Spam, Jul. 30-31, 2004, Mountain View, California, USA (8 pages).
A. Ramachandran and N. Feamster, "Understanding the Network-Level Behavior of Spammers," In Proceedings of ACM SIGCOMM, Sep. 2006 (pp. 291-302). A. Ramachandran and N. Feamster, "Filtering Spam with Behavioral Blacklisting," In Proceedings of ACM Conference on Computer and Communication Security, Oct. 2007 (pp. 342-351).

* cited by examiner

*Primary Examiner* — Jeffrey R Swearingen
*Assistant Examiner* — Taylor Elfervig
(74) *Attorney, Agent, or Firm* — Occhiuti Rohlicek & Tsao LLP

(57) ABSTRACT

A mail server makes use of characteristics of the transport and/or application layer flow (e.g., TCP and SMTP) of received email to determine whether those characteristics are consistent with spam, for example, exhibiting behavior consistent with traffic competing for link access, large round trip times and resource constrained hosts. In some examples, a statistical technique is used to process flow characteristics of a message, optionally with other characteristics of the message, to characterize the message as spam versus a valid message.

24 Claims, 9 Drawing Sheets

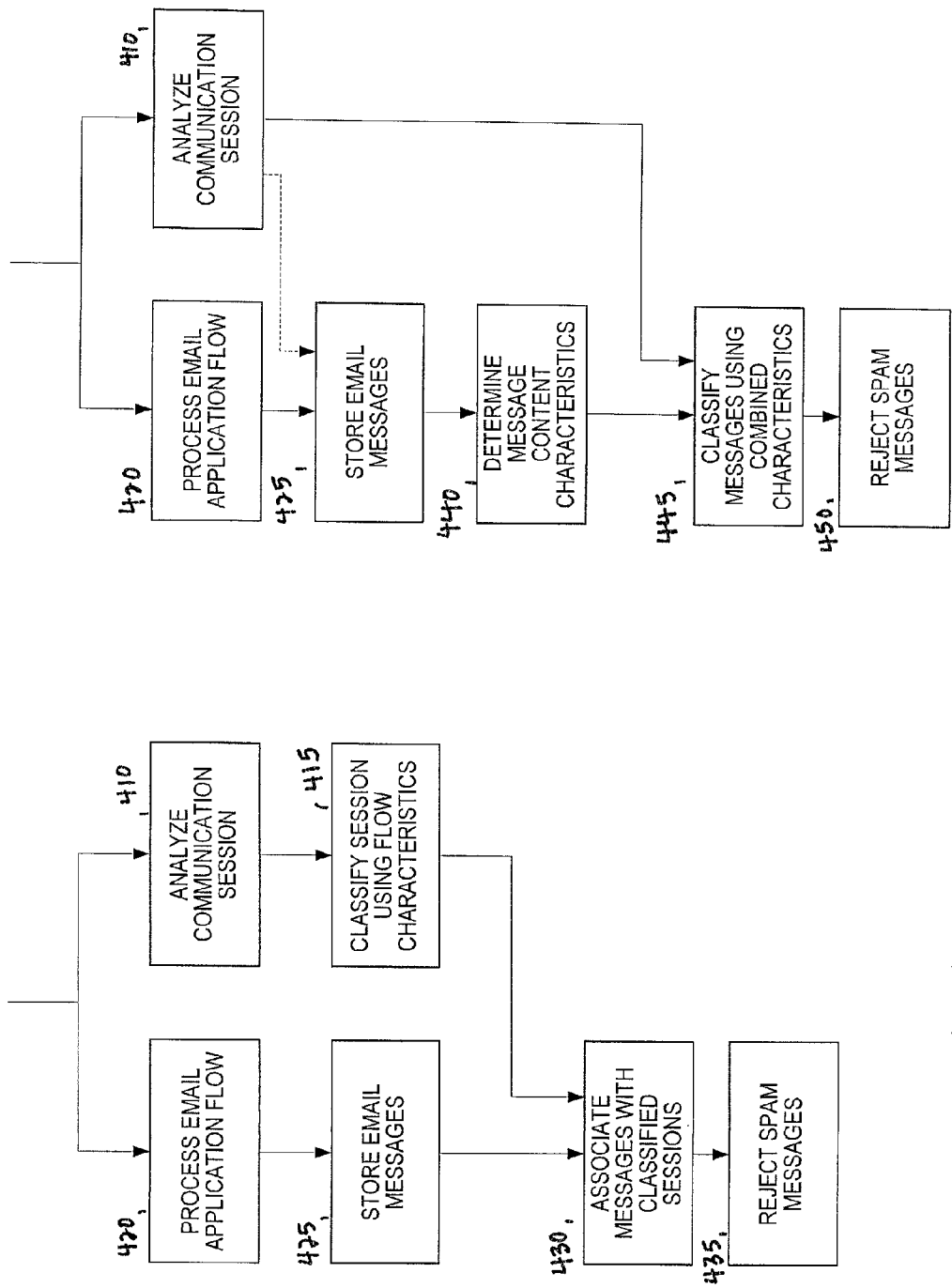

UNSOLICITED MESSAGE COMMUNICATION CHARACTERISTICS

BACKGROUND

This specification relates to communication characteristics of unsolicited messages.

By all estimates, unsolicited or undesired electronic mail ("email"), which is often referred to as "spam" (as opposed to valid email, which may be referred to as "ham"), is a pressing and continuing problem on the Internet. A consortium of service providers reports that across more than 500M monitored mailboxes, 75% of all received email is spam, amounting to more than 390B spam messages over a single quarter. Spam clogs mailboxes, slows servers and lowers productivity. Not only is spam annoying, it adversely affects the reliability and stability of the global email system.

Popular methods for mitigating spam include content analysis, collaborative filtering, reputation analysis, and authentication schemes. While some of these methods may be effective, none of these methods offer a panacea; spam is an arms race where spammers quickly adapt to, and work around, the latest prevention techniques.

Referring to FIG. 1, in some examples, email flows via a core network 110, such as the Internet, and makes use of data connections between computers, including mail servers, which are connected to the network. Today, the majority of email on the Internet makes use of data connections between mail servers over which email either is passed directly from an email source to the destination mail server, or is passed via an intermediate mail server where it may be queued before being forwarded to the destination server to another intermediate server. The virtually universal protocol for connection between mail servers on the Internet today is the Simple Mail Transfer Protocol (SMTP). SMTP is an application layer protocol that is generally passed over Transport Control Protocol (TCP) sessions, which in turn use the Internet Protocol (IP) at the network layer.

As an example, a large mail server 120 may service a number of email clients 122, which use the server to send or retrieve email. An example of software used at the mail client is Microsoft Outlook. When an email client 122 sends email, the email may pass to the large mail server 120 where it is queued, and then pass over the network 110 to the destination mail server 160 using a TCP session between the mail servers. A mail client 162 associated with the addressee of the email may then access the mail received at the mail server 160. Similarly, a small mail server 130 may service a number of email clients 132. In some examples, an email client 132 sends email via the mail server 130 to the destination mail server 110 over a similar TCP session. In some examples, a mail client 132 may also connect to the destination mail server directly without first passing the email to the email server 130. In some examples, the small mail server 130 or the mail client 132 may be connected to the network over a relatively low capacity link, for example, over a 256 kb/s link, while the large mail server may be connected to the network over a very high capacity link, for example, 10 Mb/s or greater. Therefore, characteristics of the communication session between the large mail server and the destination and the small mail server and the destination may differ, for example, in the average data rate of the transfer between the servers.

Other computers may be coupled to the network 110 via service providers 112, e.g., Internet Service Providers (ISPs), who operate an access network 114, such as a cable television network or digital subscriber lines (DSL), for linking computers to the core network. For example, a valid source of email may be a mail client application executing on a computer 150 coupled via the access network 114 to the service provider.

Spam mail may originate from a variety of sources. In some cases, the sources include compromised computers, such as a compromised computer 140 that is infected by a virus. The compromised computer sends spam to destinations, such as the destination mail server 160, typically as part of a very large number of attempted transmissions of mail messages to a large number of mail servers.

SUMMARY

In one aspect, in general, a mail server (or other mail processing software or hardware) makes use of dynamic characteristics of the transport and/or application layer flow (e.g., TCP and SMTP) over a packet switched network of received email to determine whether those characteristics are consistent with spam, for example, exhibiting behavior consistent with traffic competing for link access, large round trip times and resource constrained hosts. In some examples, a statistical technique is used to process flow characteristics of a message, optionally with other characteristics of the message, to characterize the message as unsolicited or undesired versus a valid message.

In another aspect, in general, a method for processing message communication includes processing a message communication session for passing messages from first computer to a second computer over a data network. The processing includes determining dynamic communication characteristics of the communication session. A classification result is formed using the determined dynamic communication characteristics according to a set of classes, the classes including at least a class of undesired communication. The communication session is then processed according to the classification result.

Aspects may include one or more of the following features.

The messages passing from the first computer to the second computer include mail messages and/or data requests (e.g., database queries).

Determining dynamic communication characteristics includes determining one or more timing characteristics of the communication session. For instance, the one or more timing characteristics are selected from a group consisting of a round trip time, a maximum interpacket delay time, and a packet jitter.

Determining dynamic communication characteristics includes determining one or more sequence characteristics of the communication session. For instance, the sequence characteristics are associated with one or more communication protocol states of the communication session.

The method further includes forming classification training data based on a set of communication sessions associated with valid communication and a set of communication sessions associated with undesired communication.

The classification result is formed by processing the determined dynamic communication characteristics according to the classification training data.

Specific training data is formed for each of a number of different sources and/or destinations of the message communication.

Processing the message communication session includes receiving messages passed in the communication session.

Forming the classification result includes forming a classification result for a received message passed in the communication session.

Forming the classification result includes using at least one of message content characteristics, message source characteristics, and collaborative filtering characteristics for a received message passed in the communication session.

The processing of the message communication session is performed at the second computer. Alternatively, the message communication session is performed at a network element on a data path of the communication session between the first computer and the second computer.

Processing the communication session according to the classification result includes at least one of marking messages passed in the communication session as undesired, rejecting messages passed in the communication session, slowing message processing, and terminating the communication session.

In another aspect, in general, a message communication system includes a session analyzer configured to accept a data flow for a message communication session for passing messages from first computer to a second computer over a data network, and process the data flow to determining dynamic communication characteristics of the communication session. The system also includes a classifier coupled to the session analyzer configured to form a classification result using the dynamic communication characteristics determined by the session analyzer, the forming of the classification result being according to a plurality of classes, the classes including at least a class of undesired communication. A message processing component is configured to accept the data flow for the message communication session and process the communication session according to the classification result.

The system may include one or more of the following features.

The system includes a server computer for hosting the session analyzer, the classifier and the message processing component.

The message processing component comprises a mail server application.

The system includes a network element distinct from a source and a destination of the message communication session, the session analyzer being hosted on that network element.

The system includes a server computer hosting the message processing component.

The system includes a network element distinct from a source and a destination of the message communication session, the message processing component being hosted on said network element.

The message processing component is configured to interrupt at least some communication sessions according to the classification results.

In another aspect, in general, a data network device includes a session analyzer configured to monitor a data flow for a message communication session for passing messages from first computer to a second computer over a data network via the network device. The session analyzer is configured to process the data flow to determine dynamic communication characteristics of the communication session. The device also includes a classifier coupled to the session analyzer configured to form a classification result using the dynamic communication characteristics determined by the session analyzer, the forming of the classification result being according to a plurality of classes, the classes including at least a class of undesired communication. The device is configured to alter the data flow according to the classification result.

In another aspect, in general, software stored on a computer-readable medium includes instructions for causing a data processing system to: process a message communication session for passing messages from first computer to a second computer over a data network, the processing including determining dynamic communication characteristics of the communication session; form a classification result using the determined dynamic communication characteristics according to a plurality of classes, the classes including at least a class of undesired communication; and process the communication session according to the classification result.

Advantages of one or more embodiments may include the following.

The technical problem of correct classification of spam, for example, in order to avoid unnecessary consumption of computing resources (e.g., processing or computation capacity) advantageously can make use of transport and/or application layer flow characteristics, without necessarily relying on the content (e.g., email message content) of the flow at the application layer according to statistically significant differences of such characteristics.

Analysis of the content (e.g., the information being carried by) the messages themselves is not necessarily required to identify spam.

A mail installation does not have to be as large as would be necessary to effectively make use of collaborative filtering. Collaborative filtering approaches generally rely on aggregating the collective spam of a distributed set of users to prevent previously marked spam messages from being accepted. Unfortunately, not all mail installations are large enough to take advantage of collaborative filtering and are unwilling to rely on vulnerable centralized repositories. Further, spammers can trivially make each spam unique in an effort to avoid collaborative techniques.

Certain aspects do not necessarily depend on IP addresses of mail servers or mail domains. Therefore, such aspects are particularly attractive in defending against "botnet" spam, in which IP addresses of botnets change as hosts acquire new addresses. This provides an advantage or supplement to repudiation systems, which may rely on blacklists to identify sources of spam.

The approach is particularly effective in situations in which compromised computers are on asymmetrical capacity access networks in which the outbound data capacity is much smaller than the inbound capacity.

The approach is not limited to Internet Protocol networks. The approach is applicable to other packet switched and/or statistically multiplexed communication systems that carry message flows.

Other features and advantages of the invention are apparent from the following description, and from the claims.

DESCRIPTION OF DRAWINGS

FIGS. 4A and 4B are flowcharts.

DESCRIPTION

Figure 1:
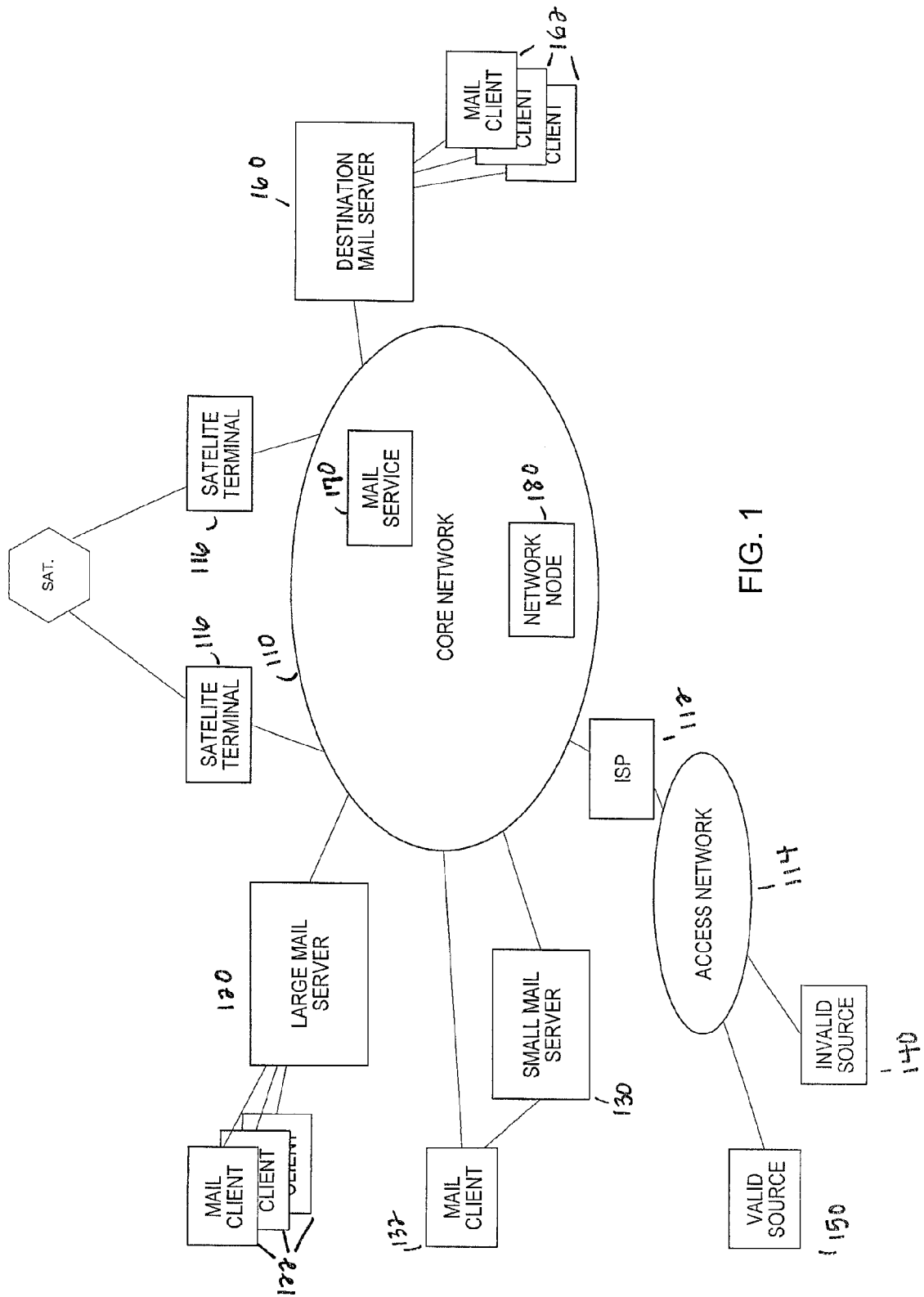
FIG. 1 is a diagram that illustrates computers and other network elements coupled via a core network.

Refer to FIG. 1, in some instances, unsolicited or otherwise undesired email ("spam") originates at a compromised computer 140, which is coupled to the core network 110 over a limited capacity access network 114. For example, the access network may include a cable television network (e.g., using a Data Over Cable Service Interface Specification, "DOCSIS,"

protocol on coaxial links to individual residences), and the computer 140 shares communication capacity from the computer to the core network with other computers on the access network. In this example, the computer is compromised (e.g., by a virus) that causes malicious software to execute on the computer. The malicious software attempts to send email messages from the computer to a large number of destination mail servers, for example, using SMTP and TCP connections from the compromised computer to the destination mail servers. The malicious software often overloads the processing capacity of the computer, and is often limited by the communication capacity of the link via the access network 114 to the core network.

When communication characteristics, such as dynamic characteristics including timing and/or sequencing (e.g., state transition) characteristics of the transport and/or application layer flow (e.g., TCP and SMTP protocol flows), of received spam are compared to corresponding valid email ("ham"), a number of significant differences are observed. A number of aspects described below take advantage of these recognized differences.

One example of a characteristic that has been observed to be different for spam and valid email is the Round Trip Time (RTT) estimate for packets passing between the destination mail server and the source of the email. For example, the RTT is estimated using conventional techniques as used in setting or adjustment of parameters in TCP, for example, defined as the initial RTT estimate inferred from the three-way TCP handshake. In one data collection, only 24% of spam exhibited a RTT less than 100 ms., while 99% of valid email had RTT less than 100 ms. In some examples, a statistical classifier achieves greater that 90% in both precision (fraction of declared spam messages that are truly spam) and in recall (fraction of truly spam messages that are declared as spam) based only on a threshold RTT.

Statistically significant differences have also been observed within a set of messages identified as being spam using conventional techniques, for example, based on message content. One way to exploit these differences is to identify likely false positives in such classified messages. As an example, in one data collection, 78% of false positives in a set of messages otherwise identified as spam were distinguished from the true positives (i.e., actually spam). That is, this approach increases precision significantly, with relatively little reduction in recall.

Figure 2:
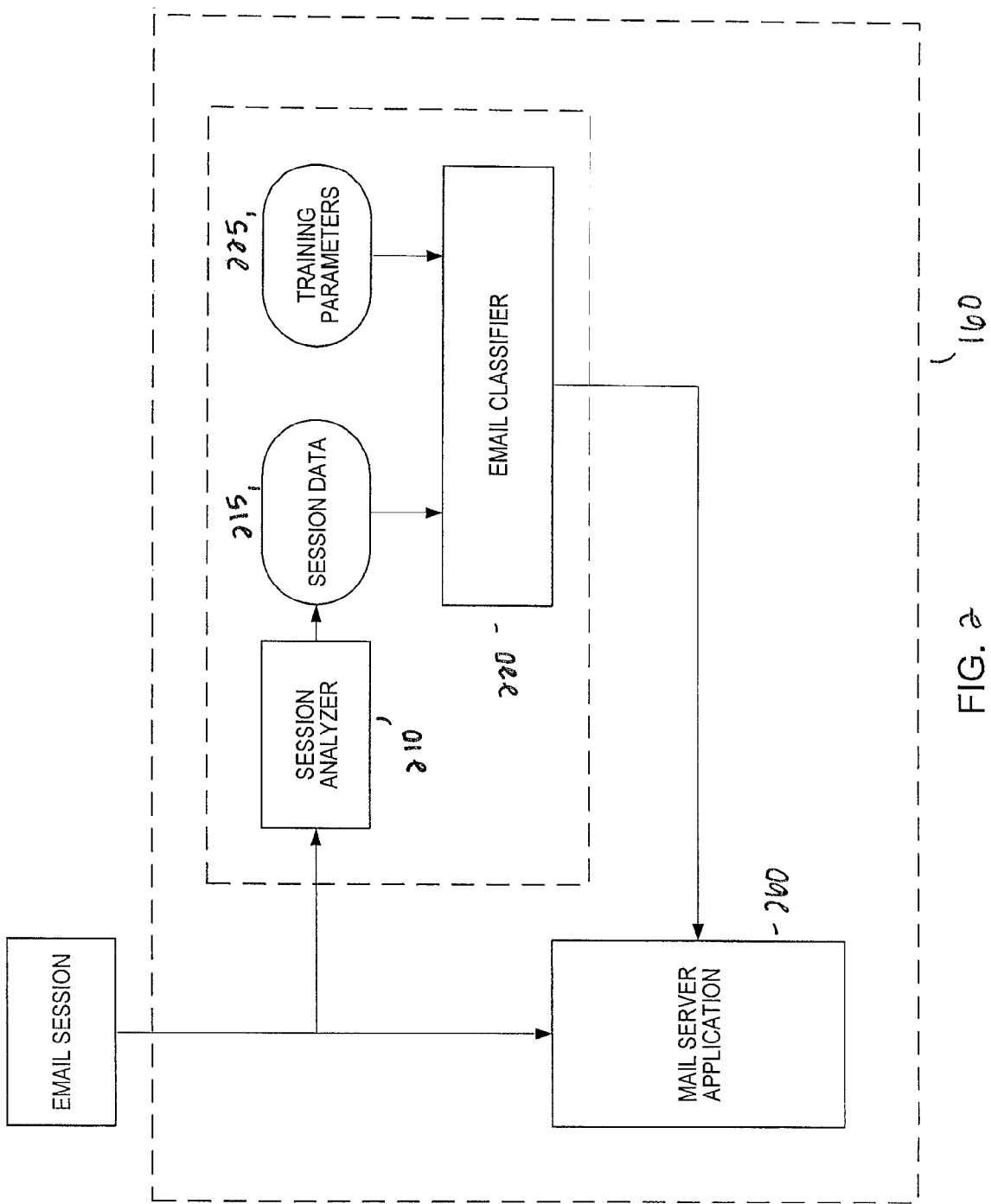
FIG. 2 is a diagram of processing modules on a mail server.

Referring to FIG. 2, in some examples, software executing on a mail server 160 includes a mail server application 260, such as Microsoft Exchange Server, which is generally referred to as a Mail Transfer Agent (MTA) application. MTAs or other software modules hosted on the server computer may be referred to as "mail servers" in certain contexts. In addition to, and in some examples separate from the mail server application, a session analyzer 210 is used to monitor communication sessions between email sources and the mail server application to determine session data 215, which includes characteristics such as the RTT characteristic discussed above. An email classifier 220 uses the session data 215 along with classifier training parameters 225 to compute a result representative of a decision or a degree of certainty that the email session represents spam, such as a Boolean value, a numeric score, or a categorical label. The mail server application 260 makes use of the output from the email classifier to treat email that is indicated to the spam differently than email that is not. Note that the arrangement of modules in FIG. 2 is representative of one example, and other alternative arrangements, some of which are described later in this specification, may be used.

Referring to FIG. 2 and the flowchart in FIG. 4A, in one example implementation, the session analyzer 210 monitors flows, including at the transport (e.g., TCP) and application (e.g., SMTP) session level (block 410). The mail server application processes the email messages in the application layer (e.g., SMTP) flow (block 420) and stores the messages in a message store (block 425). Because TCP flow information is generally not available to the application layer, in some implementations session analyzer relies on a separate, promiscuous flow aggregation process with which session analyzer communicates. In some examples, the session analyzer monitors all TCP session that are received on or sent from the standard SMTP port 25. The email classifier 220 provides for each session, which is identified by the remote server IP address and source port number, the indication of whether that flow is a flow of spam email (block 415). The mail server application 260 also records information identifying the TCP session, for example, the source IP address and port, for each mail message (e.g., including that source information in an additional header stored with the email message). The mail server application matches each email message to the output from the email classifier for the corresponding flow according to the recording session identifying information (block 430) and then makes decisions regarding email at the message level, such as rejecting spam messages (block 435) or marking the messages as spam.

The procedure shown in FIG. 2 alternatively may be applied at various elements in the network. As introduced above, in some cases mail from a source mail server does not necessary flow to its ultimate destination in one end-to-end transport or application layer communication session. For example, a destination mail server may be configured (e.g., using Domain Name Service, DNS, mail exchange entries) to have all its mail sent to a mail service 170, which processes and/or queues the email for later delivery to the mail server 160. In such a case, the session analysis may be performed at the mail service 170, which forms the endpoint of the application layer (e.g., SMTP) session with the source mail server. In other examples, the analysis described above may be performed at a network element (e.g., an IP router) that is on the path of the application layer flow but that is not an endpoint of the flow. In one such example, a service provider 112 may monitor SMTP flows passing from the access network 114 to the core network 110, and based on analysis of the monitored flows determines which flows are likely to represent spam. In some examples, the service provider may interrupt SMTP flows that appear to represent spam. In another such example, similar analysis may be performed at a satellite terminal 116, which forms the uplink node for a data link to another satellite terminal 116 via a satellite. In this way, SMTP flows that represent spam are interrupted at the uplink satellite terminal 116, thereby avoiding use of limited satellite capacity. In yet other examples, the classification of email flows in the network is not necessarily used to interrupt or reject flows that appear to represent spam, but are used to treat such flows differently, for example, by limiting their resource consumption (e.g., by setting a lower priority or metering their resource consumption) or by modifying the routing of the flows such that suspected spam may be sent of different network paths that apparently valid email.

Various implementations of the approaches outlined above may use different combinations of communication characteristics of email sessions. A discussion of further examples of such characteristics is provided below.

In addition to the RTT characteristic of the data transport, other characteristics include the maximum idle time of a session. In some examples, the maximum idle time is measured as the maximum time interval between two successive packets from the source server. In some instances the maximum idle time directly reflects the initial RTT, but is often different.

Sequencing characteristics of the protocols may also be used. For example, when an SMTP application protocol uses TCP, the TCP session passes through a set of states defined by the protocol. The characteristics of the TCP state transitions, including for example, statistics of the occupancy times in various of the states, may be used in the detection of spam. These states include the following.

SYN_SENT: Many sockets remain in the SYN_SENT state for an extended period of time, where the source mail server sends a SYN, but fails to acknowledge the response to the SYN from the destination mail server. These connections may be the result of scans for mail servers or indicative of congestion near the source.

LAST_ACK: In examination of sessions associated with spam, it has been observed that TCP sockets on the receiving mail server frequently remain in the LAST_ACK state. Investigation of the packets has shown that in many instances source servers successfully open a TCP connection and send SMTP commands. However, these servers do not appear to be reliably receiving and/or processing the destination server's acknowledgments, leading to many retransmissions. In many instances, the source server eventually closes its connection by sending a FIN. The destination server then acknowledges the FIN and closes its own connection. However, the remote server never sends an acknowledgment leading to the receiving mail server remaining in LAST_ACK state.

FIN_WAIT1: Similarly, in examination of sessions associated with spam the mail server has many sockets stuck in state FIN_WAIT1. Normally after the receiving server sends a finish (FIN) message to the source server, it would receive an acknowledgement from the source server and the receiving server would make a transition to the FIN_WAIT2 state. Inspecting these "stuck" sockets, in many instances a remote server establishes a TCP connection and again does not respond to acknowledgments. In some instances, the remote server never sends any data and the mail server eventually times out, closing the TCP connection. However, the remote server has seemingly disappeared. Since the remote server does not acknowledge the FIN sent by the receiving mail server on the connection, the socket stays in FIN_WAIT1 state.

A further example of a data transport characteristic makes use of TCP FIN segments. In a normal TCP session termination, each endpoint issues a FIN packet to reliably end the connection. It has been observed that almost 45% of the spam email flows do not send a FIN compared to only 5% for ham. Finally, a small fraction of ham flows result in two FINs whereas only 0.7% of spam flows send more than one FIN.

In some examples, the following set of thirteen features is used to characterize a email data flow:
  Total packet count (inbound and outbound)
  Total number of retransmissions (inbound and outbound)
  Number of packets with reset (RST) bit set (inbound and outbound)
  Number of packets with finish (FIN) bit set (inbound and outbound)
  Number of times a zero TCP window size is advertised by source server
  Minimum TCP window size advertised by source server
  Maximum idle time for packets from source server
  Initial and/or continuous or repeated round trip time (RTT) estimate
  Variance of interpacket delay from source server ("jitter")
  Remote software (e.g., protocol stack and operating system) signature The characteristics outlined above should be understood to be examples, and do not limit the characteristics that may be applied in the approaches described in this specification.

In a number of examples of the approaches described above, a statistical technique is used to determine the output of the email classifier (220). For example, in an example in which only RTT is used to classify email flows, a training component of the system makes use of two sets of messages flows, one set known to be (or assumed to be) valid email and another set of spam. A cumulative probability distribution is determined for the set of spam messages, represented as $Pr(RTT>r|spam)$, and a cumulative distribution is determined for all the messages together $Pr(RTT>r)$, which may be calculated as $$Pr(RTT>r)=Pr(RTT>r|spam)\,Pr(spam)+Pr(RTT>r|ham)\,Pr(ham).$$

Then, if the RTT for a message is greater than a threshold r, the conditional probability of the message being spam is computed by Bayes' Rule as $$Pr(spam \mid RTT > r) = \frac{Pr(RTT > r \mid spam)Pr(spam)}{Pr(RTT > r)}.$$

Figure 3A:
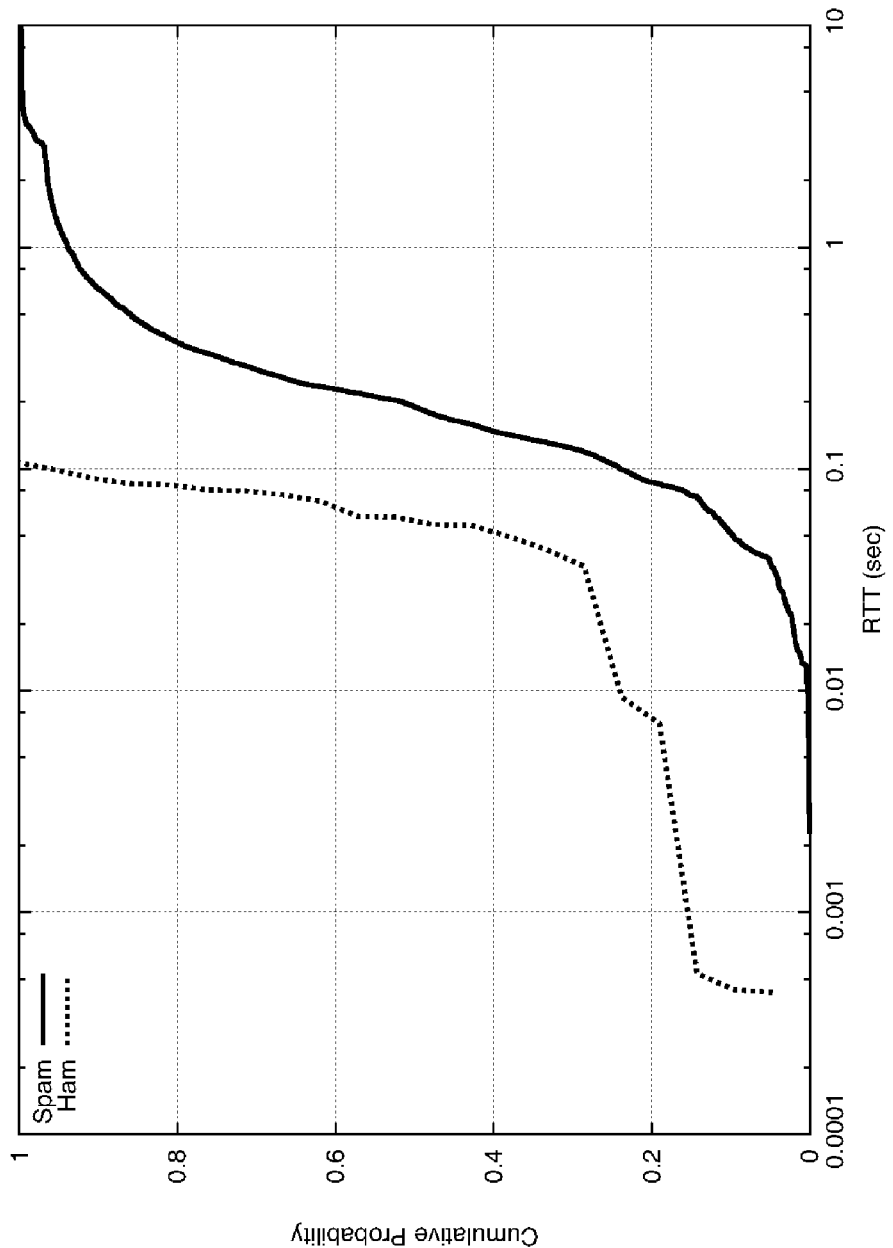
FIGS. 3A to 3F are cumulative probability distributions and conditional probabilities associated with a number of flow characteristics.

A threshold r for classification can be set according to a desired level of certainty that a message is spam. FIG. 3A show an example of cumulative probability distributions for RTT for spam and ham over a range of thresholds, and FIG. 3B shows corresponding conditional probabilities.

Figure 3B:
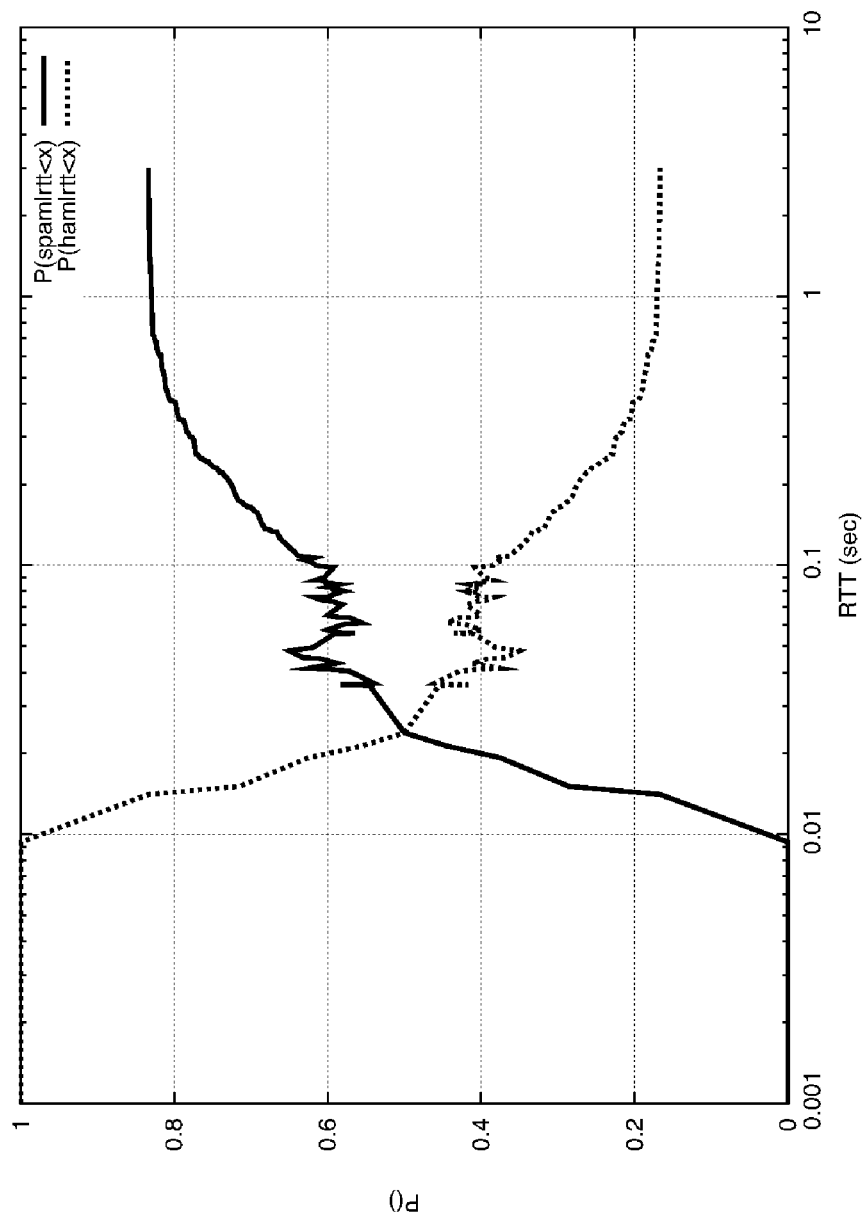

The conditional probabilities in FIG. 3B show that with an RTT threshold less than 10 ms, the probability is strongly biased toward being a ham message. With a threshold in the range 20 ms to 100 ms, the probability estimate is relatively neutral without a strong bias toward either category. However, for thresholds greater than 100 ms, there is a strong tendency toward the message being spam.

In some examples, a statistical technique that provides a score or other quantitative measure of certainty of spam as the output of the email classifier (220) is used. For example, a probability distribution (or a probability density function for a continuous variable representation) is determined for the set of spam messages, represented as $P(RTT|spam)$. Then, in some examples, the conditional (i.e., a posteriori) probability of the message being spam is computed as $$Pr(spam \mid RTT) = \frac{P(RTT \mid spam)Pr(spam)}{P(RTT)}.$$

In some examples, a likelihood ratio is used as the measure of certainty of spam:

$$LR = \frac{P(RTT \mid spam)}{P(RTT \mid ham)}.$$

Note that for some classes of users, it is not unexpected that legitimate email originates from geographically nearby sources. Thus, it is prudent in many cases to take advantage of locality of interest. However, notwithstanding the overall statistics shown in FIGS. 3A and 3B, RTT may be less of a distinguishing characteristic though for users with frequent transcontinental email flows because valid email may have a large RTT because of the geographic distance. However, approximately 50% of the spam messages have an RTT greater than 200 ms, suggesting that the remote machines are quite remote, overloaded or reside on constrained links. Further, the approximately 10% of flows with an RTT greater than one second cannot easily be explained by geographic distance and are more likely evidence of persistent congestion or end host behavior. However, in the same way that content filters may be customized on a per-user basis, the distinguishing flow characteristics can be unique to each user based on his or her receiving patterns. Furthermore, as discussed further below, RTT is just one potential feature. In instances where users receive legitimate email with large RTTs, the system may use a threshold strategy or simply lower the relative importance of RTT in favor of other flow features.

Figure 3C:
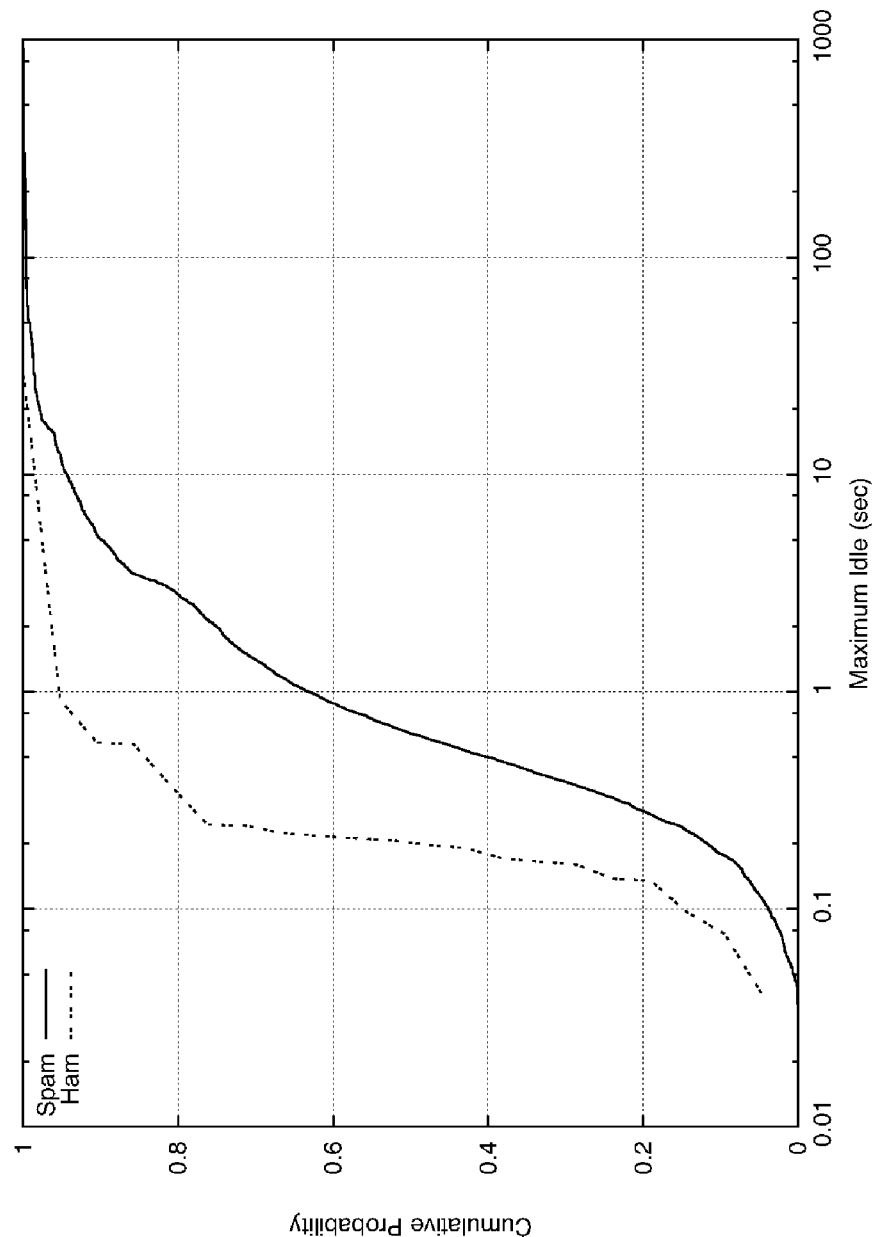
Figure 3D:
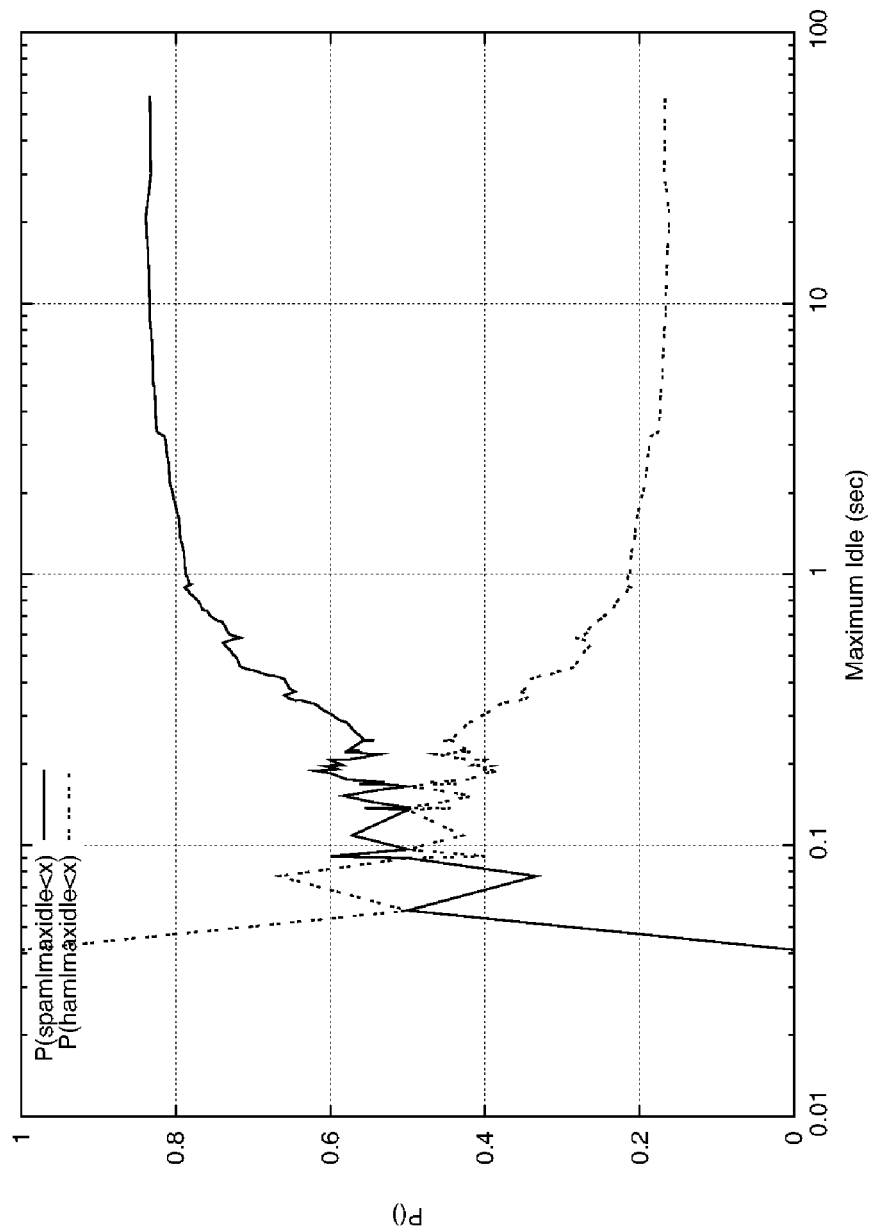

Another flow characteristic, maximum idle, reflects the maximum time interval between two successive packets from the remote mail server. In some instances the maximum idle time directly reflects the initial RTT, but is often different. Referring to FIG. 3C, the cumulative distribution of maximum idle times shows marked differences between the character of spam and ham flows. For instance, nearly 40% of spam flows have a maximum idle time greater than one second, events unlikely due to geographical locale. FIG. 3D shows the conditional probability that the message is spam. After a maximum idle of 250 ms, the probability tends strongly toward spam, as there are few legitimate messages with such a long idle time.

Figure 3E:
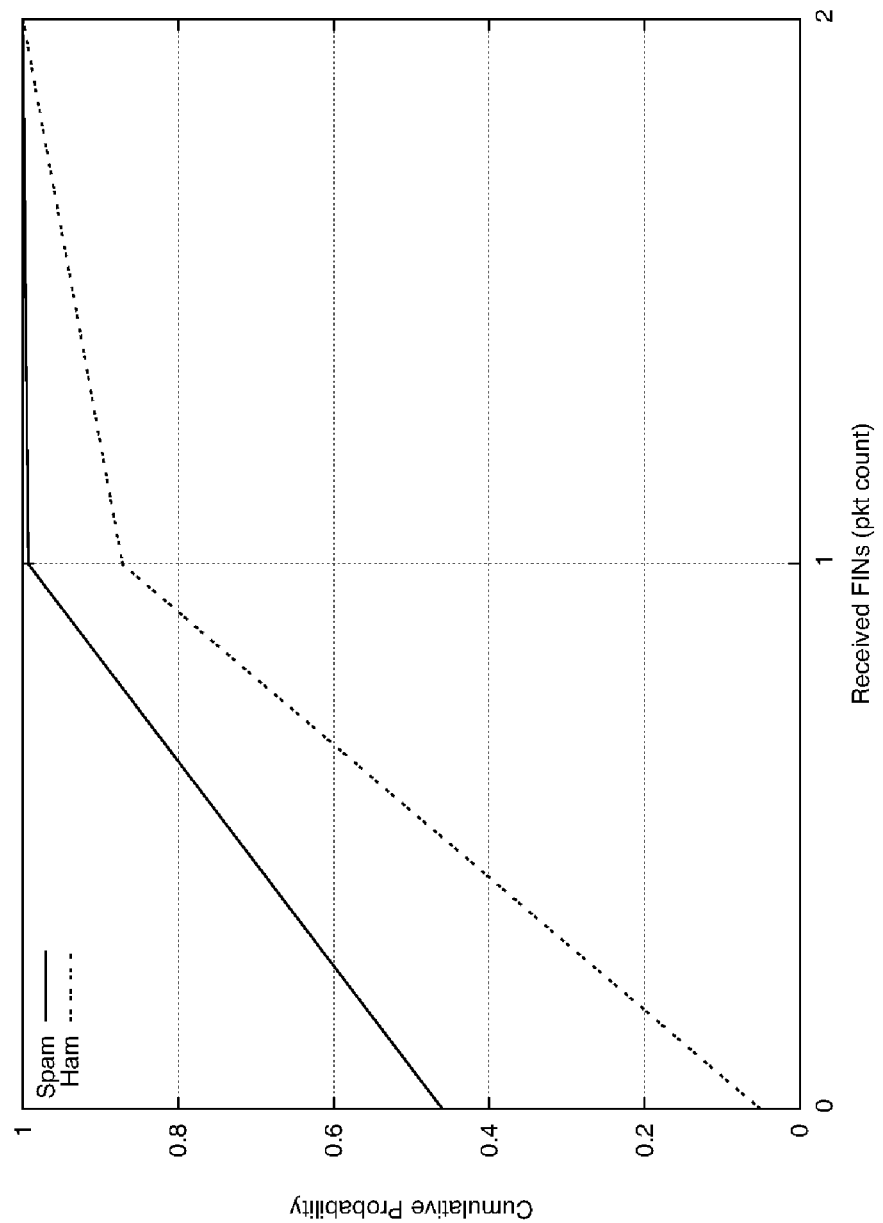
Figure 3F:
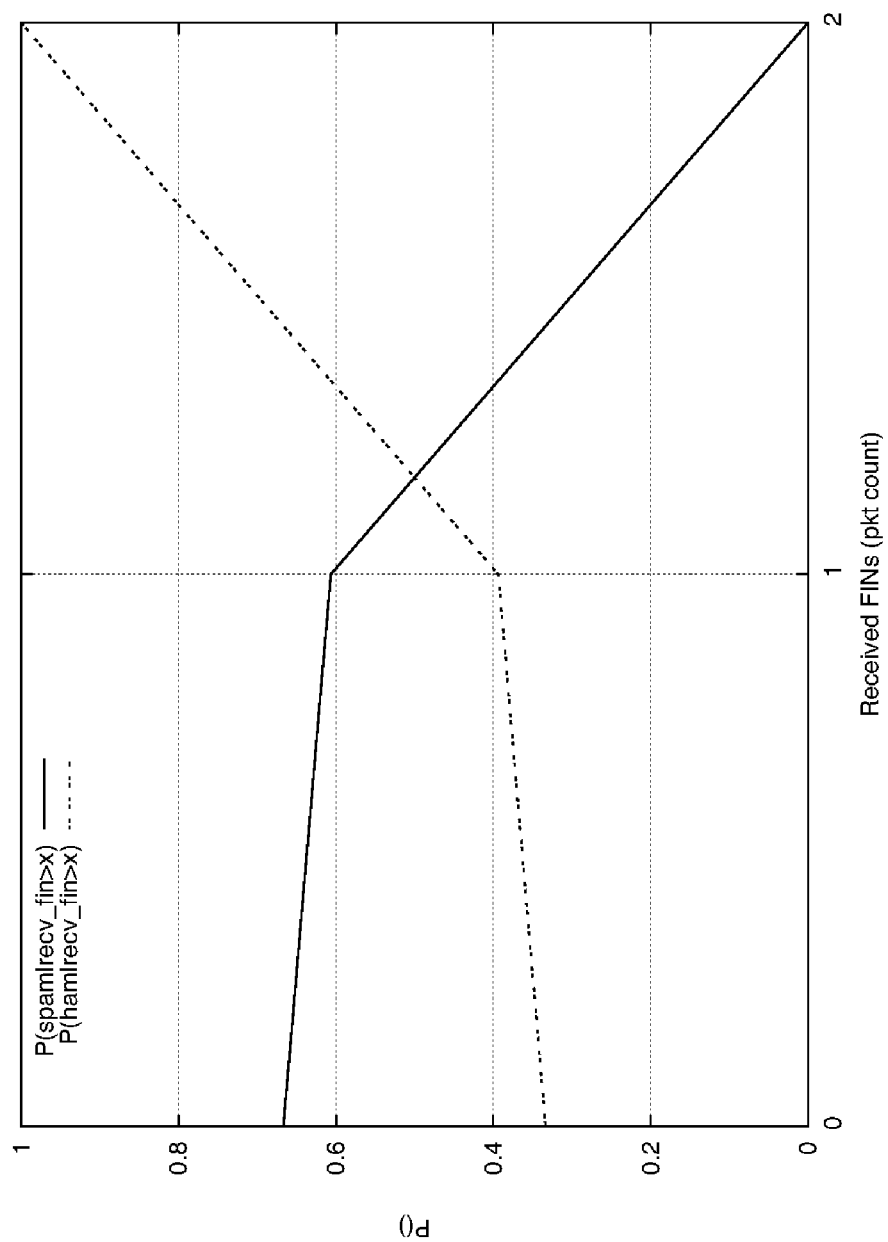

Yet another characteristic of a flow relates to TCP FIN segments. In a normal TCP session termination, each endpoint issues a finish (FIN) packet to reliably end the connection. FIG. 3E shows that almost 45% of the spam email flows do not send a FIN compared to only 5% for ham. Finally, a small fraction of ham flows result in two FINs whereas only 0.7% of spam flows send more than one FIN. The resulting conditional probabilities are given in FIG. 3F.

As introduced above, in some examples, the email classifier makes use of more than a single flow characteristic. For example, a vector of numeric flow characteristics is used. In such an example, the training data for the classifier consists of pairs of labels and characteristic vectors. In some examples, this labeled training data is used to determine training parameters (see FIG. 2, 225) for a Support Vector Machine (SVM) classifier. Generally, the training parameters for the SVM define a k-1 dimensional hyperplane than best separates the k-dimensional vectors into the two classes (spam, ham). Various other forms of classifiers, including but not limited to parametric and non-parametric statistical classifiers, decision trees, and neural networks, can alternatively be used.

In some examples, a subset of the characteristics (also referred to as features) that are available are identified, for example, according to their discrimination power to separate spam and ham and/or according their robustness (e.g., to avoid over-fitting of the training data). One approach to selection of characteristics according to their discrimination power makes use of a greedy Forward Fitting (FF) approach. Greedy forward fitting selects features in turn, starting with the most powerful feature. Often two features individually provide significant power, but the second feature provides little additional classification power. For example, the RTT and maximum idle time may be highly correlated. Forward fitting will iteratively seek the next best performing feature without this potential dependence. Forward fitting feature selection simply finds, in succession, the next single feature that minimizes an error function. Therefore, training error decreases monotonically with the number of features. In other examples, other approaches to feature selection, including selection of the specific features to use and the number of features to use. Examples of such techniques include cross-validation approaches and jackknifing techniques.

Various examples of the classifier training approach use different sources of training data. In some examples, the training data is obtained by manual examination of a set of email messages to label them as spam or ham. In some examples, end users provide indications of which email messages are spam, and these indication are collected to form the set of training spam messages. In some examples, the training data is based on an automated classification approach, for example, based on message content or collaborative filtering. Note that in such cases the training data may be imperfect in that some email messages are mislabeled, but the classifier training may nevertheless be effective. In some examples, the training parameters are recomputed or adapted during use of the system, for example, based on decisions made on past email messages. In some examples, the training parameters are computed by a centralized entity and distributed to mail servers where the email classification is made. In some examples, examples of spam email messages are collected using a "honey pot" technique in which a mail server is set up to receive spam but without truly valid email addresses.

In some examples, the discrimination power of the communication characteristics is combined with other information for classification of email. One example, as outlined above, is to use an email classifier based on communication characteristics as a secondary classification of email classified as spam using other techniques.

Referring to the flowchart in FIG. 4B, another approach is to augment the flow-related characteristics with content related features. For example, presence of particular words in an email may be used as additional features. As in the process shown in FIG. 4A, the mail server processes the application layer flow (block 420) to identify individual mail messages, and the session analyzer determined communication characteristics of the corresponding data flows (block 410). The mail server application stores the email messages in a mail store (block 425), optionally storing the communication characteristics from the session analyzer in association with the messages (e.g., according to the source IP address and port numbers). The mail server application (or an associated software component) applies content-based or a collaboration filtering based technique to the email messages to produce features for each message and/or a score that indicates a certainty that the email is spam. Then, those features and/or score are used together with the communication characteristics (such as RTT), which are received from the session analyzer (or retrieved from the message store if they were previous provided by the session analyzer) in an email classifier to make a decision (block 445). For example, an extended feature vector is used in a statistical classifier in the same way that a feature vector having only communication characteristics is used in other examples.

In some examples, rather than receiving the email messages in a spam message flow and subsequently classifying the messages as spam, the session analyzer provides information to the mail server application as it is processing a session, thereby allowing the mail server application to terminate processing of the session (or otherwise handling it in a different manner, such as at a lower priority) even before the spam messages are received or processed by the mail server. Similarly, in examples in which a session analyzer is applied in the network (e.g., at a satellite uplink node), the email session may be interrupted based on the session analysis thereby preventing the spam messages from ever reaching the destination mail server.

The discussion above is provided primarily in the context of email. However, it should be understood that other application protocols involve the interchange of messages, which may carry application information and/or relate protocol specified interactions. For example, the messages may relate to data access requests from a network data server (e.g., a database server). The techniques described above can be applied to other forms of malicious message communication, include email using protocols other than SMTP, TCP, and/or IP, and to communication such as "instant" text messages or telecommunication Short Message Service (SMS) messages. Furthermore, the approaches described above for email data flows may be applied to classification of malicious flows to other servers, for example, to detect attacks that may overload a server.

The approaches described above can be implemented in various configurations. In some software implemented examples, all the runtime modules are hosted on a mail server, for example, as illustrated in FIG. 2. In some examples, portions of the processing are not necessarily performed on the mail server. For instance, the analysis of the transport and/or application layer sessions may be performed in a hardware and/or a software implemented network element on the communication path from the email source to the destination mail server, such as a gateway, router, or firewall device. The mail server that makes use of the session data or the classification of communication flows may be separate from the analysis components, for example, with the session data or classification of the flow being sent to the mail server over the data network. In some examples, a mail processing component that functions as an intermediate mail server or a proxy server is in the path between the source mail server and the destination mail server, for example, being hosted on the same device as the analysis components. For example, mail messages mail be buffered in the device while the analysis of their flow is being carried out, and then spam classified messages are handled differently than other messages, for example, being discarded or delayed. In some examples, the training component is hosted on the same computer as the mail server. In some examples, the training component is performed on another component, for example, at a separate server. In some examples, the training parameters are distributed from such a server to multiple dedicated devices or mail servers where the training parameters are used for analysis of the message flows. In some examples, the training parameters are distributed from a central server along with content-based classifier data. In some examples, the output of the session analyzer and/or the email classifier is stored in a database for access by the mail server application or another email classification component or is used to augment message data in an email database.

Examples of the approaches described above may be implemented in software, in hardware, or in a combination of hardware and software. Software implementations may include instructions (e.g., machine instructions for physical and/or virtual machines or high-level programming language statements) stored on computer media (e.g., magnetic or optical disks) for causing the modules to perform the functions described above.

It is to be understood that the foregoing description is intended to illustrate and not to limit the scope of the invention, which is defined by the scope of the appended claims. Other embodiments are within the scope of the following claims.

What is claimed is:

1. A method for processing message communication comprising:
  processing a plurality of messages of a communication session for passing content from first computer to a second computer over a data network, the processing of the plurality of messages including determining dynamic communication characteristics of the plurality of messages, wherein determining the dynamic communication characteristics of the plurality of messages includes determining one or more timing characteristics of the plurality of messages, the one or more timing characteristics selected from a group consisting of a round trip time, a maximum interpacket delay time, and packet jitter;
  forming a classification result using the determined dynamic communication characteristics according to a plurality of classes, the classes including at least a class of undesired unsolicited mail message communication; and
  processing the communication session according to the classification result.

2. The method of claim 1 wherein the content passing from the first computer to the second computer comprises data requests.

3. The method of claim 1 wherein determining dynamic communication characteristics of the plurality of messages includes determining one or more sequence characteristics of the plurality of messages.

4. The method of claim 3 wherein the sequence characteristics are associated with one or more communication protocol states of the communication session.

5. The method of claim 1 further comprising forming classification training data based on a first set of communication sessions associated with valid communication and a second set of communication sessions associated with undesired communication.

6. The method of claim 5 wherein forming the classification result includes processing the determined dynamic communication characteristics according to the classification training data.

7. The method of claim 5 wherein forming the training data includes forming specific training data for each of a plurality of sources and/or destinations of sessions of the first set and second set of message communication sessions.

8. The method of claim 1 wherein processing the plurality of messages of the communication session includes receiving messages passed in the communication session.

9. The method of claim 8 wherein forming the classification result includes forming a classification result for a received message passed in the communication session.

10. The method of claim 8 wherein forming the classification result further includes using at least one of message content characteristics, message source characteristics, and collaborative filtering characteristics for a received message passed in the communication session.

11. The method of claim 1 the processing of the plurality of messages of the communication session is performed at the second computer.

12. The method of claim 1 the processing of the plurality of messages of the communication session is performed at a network element on a data path of the communication session between the first computer and the second computer.

13. The method of claim 1 wherein processing the communication session according to the classification result includes at least one of marking messages passed in the communication session as undesired, rejecting messages passed in the communication session, slowing message processing, and terminating the communication session.

14. A message communication system comprising:
a session analyzer configured to accept a data flow for a message communication session for passing content from first computer to a second computer over a data network, and process a plurality of messages included in the data flow to determine dynamic communication characteristics of the plurality of messages, the dynamic communication characteristics including one or more timing characteristics of the plurality of messages, the one or more timing characteristics selected from a group consisting of a round trip time, a maximum interpacket delay time, and packet jitter;
a classifier coupled to the session analyzer configured to form a classification result using the dynamic communication characteristics determined by the session analyzer, the forming of the classification result being according to a plurality of classes, the classes including at least a class of undesired unsolicited mail message communication; and
a message processing component configured to accept the data flow for the message communication session and process the communication session according to the classification result.

15. The system of claim 14 comprising a server computer for hosting the session analyzer, the classifier and the message processing component.

16. The system of claim 14 wherein the message processing component comprises a mail server application.

17. The system of claim 14 wherein the system comprises a network element distinct from a source and a destination of the message communication session, the session analyzer being hosted on said network element.

18. The system of claim 17 wherein the system further comprises a server computer hosting the message processing component.

19. The system of claim 14 wherein the system comprises a network element distinct from a source and a destination of the message communication session, the message processing component being hosted on said network element.

20. The system of claim 19 wherein the message processing component is configured to interrupt at least some communication sessions which are associated with undesired communication according to the classification results.

21. Software stored on a non-transitory computer-readable medium comprising instructions for causing a data processing system to:
process a plurality of messages of a communication session for passing content from first computer to a second computer over a data network, the processing of the plurality of messages including determining dynamic communication characteristics of the plurality of messages, wherein determining the dynamic communication characteristics of the plurality of messages includes determining one or more timing characteristics of the plurality of messages, the one or more timing characteristics selected from a group consisting of a round trip time, a maximum interpacket delay time, and packet jitter;
form a classification result using the determined dynamic communication characteristics according to a plurality of classes, the classes including at least a class of undesired unsolicited mail message communication; and
process the communication session according to the classification result.

22. The system of claim 1 wherein the plurality of messages includes communication protocol messages.

23. The system of claim 22 wherein the communication protocol messages include application layer messages.

24. The system of claim 22 wherein the communication protocol messages include transport layer messages.

* * * * *